United States Patent [19]

Kemper

[11] Patent Number: 4,549,595

[45] Date of Patent: Oct. 29, 1985

[54] TIRE CHANGER ADAPTER

[76] Inventor: John M. Kemper, R.R. 1, Box 1, Worthville, Ky. 41098

[21] Appl. No.: 630,224

[22] Filed: Jul. 12, 1984

[51] Int. Cl.⁴ .............................................. B60C 25/00
[52] U.S. Cl. .......................................... 157/1; 157/21
[58] Field of Search ................................ 157/1, 14, 21

[56] References Cited

U.S. PATENT DOCUMENTS 4,167,118  9/1979  Hihara .................................... 157/21

FOREIGN PATENT DOCUMENTS 1095397  2/1981  Canada .................................... 157/1

Primary Examiner—James G. Smith
Attorney, Agent, or Firm—Frank C. Leach, Jr.

[57] ABSTRACT

A substantially flat plate is positioned on a rim, which has a large central opening and no lug holes, to enable a tire to be mounted thereon or dismounted therefrom by a tire changer requiring a rim to have lug holes around the central opening to hold the rim. The flat plate has its length selected so that its opposite ends rest on an annular portion of the rim. The opposite ends of the flat plate have substantially the same curve as the annular portion of the rim on which they rest. The flat plate has a central circular opening to receive a threaded shaft of the tire changer supporting the rim. A hollow tube extends downwardly from the bottom surface of the flat plate adjacent the central opening for disposition over a positioning pin of the tire changer on which the rim is supported. When a hold down cone of the tire changer is manually threaded on the threaded shaft of the tire changer extending through the central opening of the flat plate, the outer surface of the cone bears against the upper edge of the central opening in the flat plate to hold it against the rim to retain the rim against the tire changer. The hollow tube cooperates with the positioning pin to prevent rotation of the rim, the tire, and the flat plate when forces are applied by the tire changer to the side walls of the tire to dismount the tire from the rim or to mount the tire on the rim.

20 Claims, 4 Drawing Figures

TIRE CHANGER ADAPTER

This invention relates to a tire changer adapter and, more particularly, to a tire changer adapter enabling dismounting of a tire from or mounting of a tire on a rim having a central opening with no lug holes by a tire changer requiring a rim to have lug holes around its central opening.

The dismounting of a tubeless tire from a rim of an automobile wheel requires substantial force to be applied to remove the beads of the tire away from engagement with the complementary portions of the rim of the wheel. These same forces must be applied to push the beads into position relative to the complementary portions of the rim of the wheel when mounting a tire on the rim of the wheel.

Various tire changers have previously been suggested for this purpose. One such tire changer is shown in U.S. Pat. No. 2,895,519 to Coats. Another tire changer is sold by The Coats Company Inc. as Coats 30.40A Air-Flate tire changer.

These presently available automobile wheel tire changers require the rim to have a central opening surrounded by lug holes as is well known for an automobile wheel. This is because the tire changer has a threaded shaft extending upwardly from a support through a central opening of the rim to receive a cone to hold the rim against the support of the tire changer.

The tire changer also has a positioning pin, which is much shorter than the threaded shaft, extending upwardly from the support on which the rim is positioned for disposition in one of the lug holes of the rim. This prevents rotation of the wheel when forces are applied either upwardly against the bottom side wall of the tire on the rim or downwardly against the upper side wall of the tire on the rim to break the beads of the tire from the complementary portions of the rim.

These tire changers satisfactorily enable removal of the tire from the rim of the wheel. However, they require the rim to have a central opening surrounded by lug holes in order to function properly.

Various wheels used on some trailers are formed with a relatively large central opening in the rim but without any lug holes in the rim. The rim is mounted on the trailer axle without the use of lug bolts so that the lug holes are not required in the rim.

These wheels also require substantial forces to be applied to the tubeless tire to break the tire from the rim in the same manner as an automobile wheel. However, the requirement of the lug holes in the rim has previously prevented the use with a trailer wheel of the presently available tire changers in which the positioning pin of the tire changer must be disposed in one of the lug holes to prevent rotation of the rim relative to the tire changer when forces are applied to the tire to break the beads.

The adapter of the present invention satisfactorily solves the foregoing problem through enabling a rim having a large central opening and no lug holes surrounding it to be used with a tire changer requiring lug holes to surround a central opening in the rim. The adapter of the present invention accomplishes this through providing means for cooperation with the threaded shaft, the hold down cone, and the positioning pin of the tire changer so that the rim may be retained on the support of the tire changer and prevented from rotating by the positioning pin. Thus, the adapter of the present invention enables dismounting of a tire from a rim or mounting of a tire on a rim by a tire changer even though the rim does not have the required lug holes surrounding the central opening in the rim.

Accordingly, the adapter of the present invention enables one having an automobile tire changer to use it for changing tires on rims having no lug holes. Therefore, the relatively inexpensive adapter of the present invention produces a substantial saving for one having to change a tire mounted on a rim having no lug holes.

An object of this invention is to provide a unique tire changer adapter.

Another object of this invention is to provide an adapter to enable a tire on a rim without lug holes to be changed on a tire changer requiring lug holes in the rim surrounding a central opening.

Other objects of this invention will be readily perceived from the following description, claims, and drawing.

This invention relates to an adapter for use with a rim having a large central opening and no lug holes to enable dismounting of a tire from the rim or mounting of the tire on the rim by a tire changer requiring a rim to have lug holes around a central opening. The adapter includes a substantially flat plate, which has a selected shape, having its opposite ends resting on diametrically disposed portions of a rim having a large central opening and no lug holes and from which a tire is to be dismounted or on which a tire is to be mounted. The flat plate has an opening extending therethrough to receive a threaded shaft or the like of a tire changer on which the rim is to be supported with the opening having a size to cooperate with retaining means of the tire changer secured to the threaded shaft to enable the retaining means to hold the flat plate against the rim supported on the tire changer. The flat plate has means cooperating with a positioning pin of the tire changer supporting the rim and extending through the large central opening of the rim to prevent rotation of the rim, any tire mounted on the rim, and the flat plate when force is applied to each side wall of the tire by the tire changer to dismount the tire from the rim or to mount the tire on the rim.

The attached drawing illustrates a preferred embodiment of the invention, in which.

Figure 1:
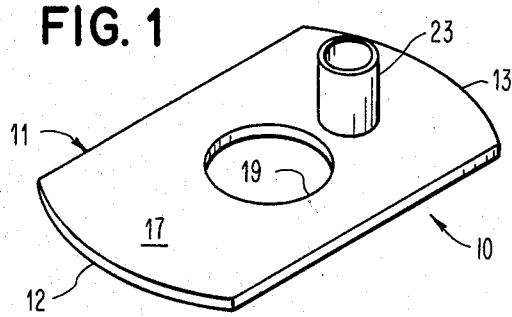
FIG. 1 is a bottom perspective view of an adapter of the present invention.

Referring to the drawing and particularly FIG. 1, there is shown a tire changer adapter 10 comprising a substantially flat plate 11. The flat plate 11 is substantially rectangular shaped and has its length greater than its width.

Figure 2:
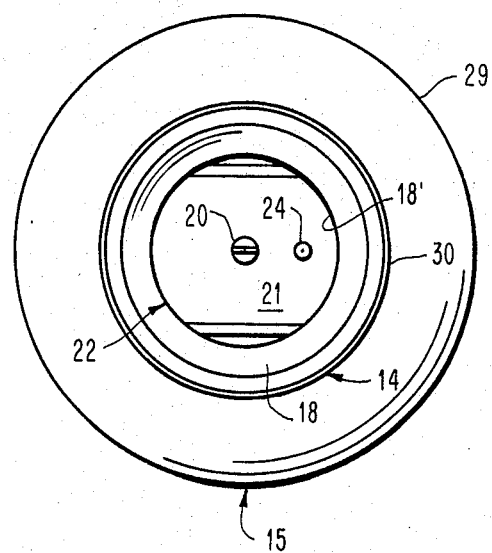
FIG. 2 is a top plan view of a wheel having a rim with a central opening and no lug holes positioned on a support of a tire changer requiring the rim to have lug holes surrounding the central opening.
Figure 3:
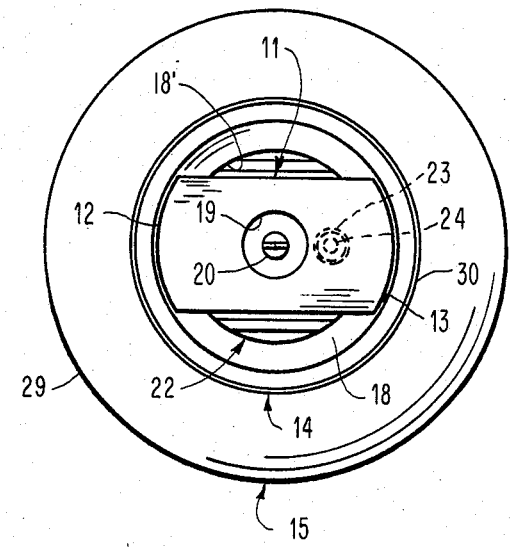
FIG. 3 is a top plan view of the adapter of the present invention disposed within the rim of the wheel of FIG. 2 on the support of the tire changer.

The flat plate 11 has its opposite ends 12 and 13 formed on a radius of curvature. When the flat plate 11 is disposed on a rim 14 of a wheel 15 as shown in FIG. 3, the flat plate 11 has its bottom surface 17 (see FIG. 1) resting on a substantially flat annular portion 18 (see FIGS. 2 and 3) of the rim 14, which has a large central circular opening 18'. The ends 12 and 13 have substantially the same curvature as the annular portion 18 of the rim 14 on which they rest.

The flat plate 11 has a central circular opening 19 (see FIG. 1) of sufficient diameter to receive a threaded shaft 20 (see FIG. 3) extending upwardly from a support 21 (see FIG. 4) of a tire changer 22 and through the opening 18' in the rim 14. One suitable example of the tire changer 22 is the Coats 30.40A Air-Flate sold by The Coats Company Inc.

As shown in FIG. 1, the bottom surface 17 of the flat plate 11 has a hollow tube 23 extending downwardly therefrom. The hollow tube 23 is disposd adjacent the central circular opening 19 to fit over a positioning pin 24 (see FIG. 4) of the tire changer 22 extending upwardly from the support 21 of the tire changer 22 and through the opening 18' in the rim 14. The positioning pin 24 is substantially shorter than the threaded shaft 20 since the positioning pin 24 has been designed to fit within one of the lug holes of an automobile tire wheel and these are positioned close to the central opening of the automobile tire wheel. It is not desired for the positioning pin 24 of the tire changer 22 to protrude substantially beyond the portion of the automobile rim having the lug holes.

The hollow tube 23 surrounds the positioning pin 24 to prevent any relative rotational movement therebetween. Accordingly, when the bottom surface 17 of the flat plate 11 is held against the flat annular portion 18 of the rim 14 by a hold down element 25 cooperating with the threaded shaft 20 of the tire changer 22 and bearing against an upper edge 26 of the central circular opening 19 in the flat plate 11, the rim 14 is retained against the support 21 of the tire changer 22.

Figure 4:
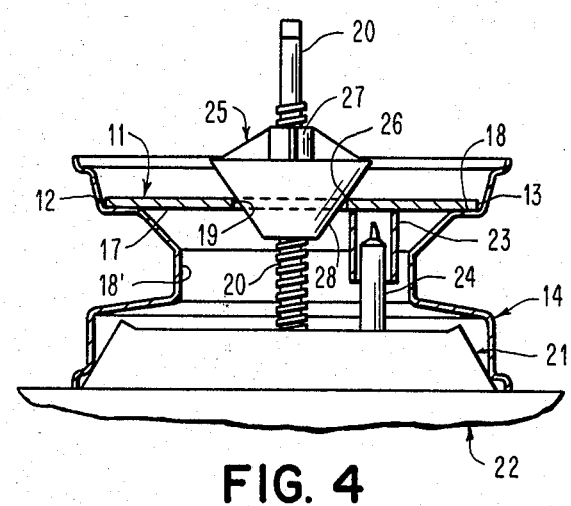
FIG. 4 is a sectional view, partly in elevation, showing hold down means of the tire changer positioned against the adapter of the present invention but without a tire mounted on the rim.

The hold down element 25 includes a threaded central portion 27 of cylindrical shape for threading on the threaded shaft 20 of the tire changer 22. The hold down element 25 has an outer conical lower surface 28, which surrounds the threaded central portion 27, bearing against the upper edge 26 of the central circular opening 19 in the flat plate 11 as shown in FIG. 4. The hold down element 25 is tightened against the rim 14 by manually turning it on the threaded shaft 20.

If it is desired to dismount a tire 29 (see FIGS. 2 and 3) from the rim 14, then force applying means of the tire changer 22 (see FIG. 4) is utilized to apply forces to the upper and lower side walls of the tire 29 (see FIGS. 2 and 3) to break the beads of the tire 29 from the rim 14.

If the tire 29 is to be mounted on the rim 14, it is placed above the rim 14 and pushed downwardly initially. Forces are then applied to each of the two side walls to force the beads of the tire 29 over an outer circumferential edge 30 of the rim 14.

While the present invention has shown and described the hollow tube 23 of the flat plate 11 as surrounding the positioning pin 24 (see FIG. 4) of the tire changer 22, it should be understood that any other suitable means for cooperating with the positioning pin 24 could be utilized to prevent rotation of the flat plate 11 (see FIGS. 2 and 3) and the cooperating rim 14.

The size of the flat plate 11 is dependent upon the size of the rim 14 with which it is used. For example, if the rim 14 has a diameter of 14.5 inches, the flat plate 11 (see FIG. 1) would be 8 inches wide and 13½ inches long. The diameter of the opening 19 would be 4 inches with the hollow tube 23 having an inner diameter of 1⅝ inches and an outer diameter of 1⅞ inches. The hollow tube 23 extends downwardly 3 inches from the bottom surface 17 of the flat plate 11, which has a thickness of 5/16 inches. These dimensions are merely one example.

An advantage of this invention is that it is relatively inexpensive. Another advantage of this invention is that it enables a rim without lug holes surrounding its central opening to be used with a tire changer requiring such.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. An adapter for use with a rim having a large central opening and no lug holes to enable dismounting of a tire from the rim or mounting of the tire on the rim by a tire changer requiring a rim to have lug holes around a central opening including:

a substantially flat plate having a selected shape, said flat plate having its opposite ends resting on diametrically disposed portions of a rim having a large central opening and no lug holes and from which a tire is to be dismounted or on which a tire is to be mounted;

said flat plate having an opening extending therethrough to receive a threaded shaft or the like of a tire changer on which the rim is to be supported, said opening having a size to cooperate with retaining means of the tire changer secured to the threaded shaft to enable the retaining means to hold said flat plate against the rim supported on the tire changer;

and said flat plate having means cooperating with a positioning pin of the tire changer supporting the rim and extending through the large central opening of the rim to prevent rotation of the rim, any tire mounted on the rim, and said flat plate when force is applied to each side wall of the tire by the tire changer to dismount the tire from the rim or to mount the tire on the rim.

2. The adapter according to claim 1 in which said cooperating means includes means extending downwardly from said flat plate and cooperating with the positioning pin of the tire changer supporting the rim.

3. The adapter according to claim 2 in which said downwardly extending means is a hollow tube.

4. The adapter according to claim 3 in which:
   said flat plate is substantially rectangular shaped;
   and each of said opposite ends of said flat plate resting on the rim is formed with a curve having substantially the same radius as the portion of the rim on which each of said opposite ends of said flat plate rests.

5. The adapter according to claim 4 in which said flat plate has a length greater than its width.

6. The adapter according to claim 5 in which said opening in said flat plate is centrally located in said flat plate.

7. The adapter according to claim 3 in which said opening in said flat plate is centrally located in said flat plate.

8. The adapter according to claim 2 in which:
   said flat plate is substantially rectangular shaped;
   and each of said opposite ends of said flat plate resting on the rim is formed with a curve having substantially the same radius as the portion of the rim on which each of said opposite ends of said flat plate rests.

9. The adapter according to claim 8 in which said flat plate has a length greater than its width.

10. The adapter according to claim 9 in which said opening in said flat plate is centrally located in said flat plate.

11. The adapter according to claim 2 in which said opening in said flat plate is centrally located in said flat plate.

12. The adapter according to claim 1 in which said cooperating means includes means extending downwardly from said flat plate and surrounding the positioning pin of the tire changer supporting the rim.

13. The adapter according to claim 12 in which said downwardly extending means is a hollow tube.

14. The adapter according to claim 13 in which:
said flat plate is substantially rectangular shaped;
and each of said opposite ends of said flat plate resting on the rim is formed with a curve having substantially the same radius as the portion of the rim on which each of said opposite ends of said flat plate rests.

15. The adapter according to claim 14 in which said flat plate has a length greater than its width.

16. The adapter according to claim 15 in which said opening in said flat plate is centrally located in said flat plate.

17. The adapter according to claim 13 in which said opening in said flat plate is centrally located in said flat plate.

18. The adapter according to claim 12 in which:
said flat plate is substantially rectangular shaped;
and each of said opposite ends of said flat plate resting on the rim is formed with a curve having substantially the same radius as the portion of the rim on which each of said opposite ends of said flat plate rests.

19. The adapter according to claim 18 in which said flat plate has a length greater than its width.

20. The adapter according to claim 12 in which said opening in said flat plate is centrally located in said flat plate.

* * * * *